United States Patent [19]
Gagnon

[11] Patent Number: 5,467,585
[45] Date of Patent: Nov. 21, 1995

[54] BRUSHWOOD CLEARING MACHINE CAPABLE OF CUTTING AND RECUPERATING THE CUT BRUSHWOOD MATERIAL

[76] Inventor: Maurice Gagnon, 159, Rang St-Joseph, St-Fulgence, Québec, Canada, G0V 1S0

[21] Appl. No.: 271,653

[22] Filed: Jul. 7, 1994

[51] Int. Cl.⁶ .......................... A01D 49/00; A01G 23/08
[52] U.S. Cl. .............. 56/14.3; 56/16.6; 56/504; 144/34 R
[58] Field of Search .................... 56/14.3, 14.4, 56/16.6, 194, 504, 505; 144/34 R, 336

[56] References Cited

U.S. PATENT DOCUMENTS

| | | | |
|---|---|---|---|
| 1,830,245 | 11/1931 | Rowe | 56/505 |
| 2,554,195 | 5/1951 | Jones | 56/167 |
| 2,777,267 | 1/1957 | Thompson | 56/14.3 X |
| 2,829,481 | 4/1958 | Jarvis | 56/1 |
| 3,118,265 | 1/1964 | Shaver | 56/23 |
| 3,191,373 | 6/1965 | Schwalm | 56/504 |
| 3,233,394 | 2/1966 | Lundell | 56/1 |
| 3,683,602 | 8/1972 | Scarnato et al. | 56/14.4 |
| 3,745,754 | 7/1973 | Gronberg | 56/14.4 |
| 3,996,980 | 12/1976 | Pallari | 144/34 E |
| 4,043,366 | 8/1977 | Pallari | 144/34 E |
| 4,158,945 | 6/1979 | Burke | 56/503 |
| 4,204,386 | 5/1980 | Spinoglio | 56/14.4 |
| 4,232,719 | 11/1980 | Payton | 144/34 R |
| 5,303,753 | 4/1994 | Crandall | 144/336 X |

Primary Examiner—George A. Suchfield

[57] ABSTRACT

A brushwood clearing machine comprises two mutually adjacent brushwood cutting units rotating in opposite directions about respective parallel axes lying in a generally horizontal plane. The cutting units are elongate and comprise cylindrical surfaces centered on the axes of rotation, and longitudinal brushwood cutting blades mounted on the cylindrical surfaces. In the region between the cylindrical surfaces of the two cutting units, the cutting blades of one cutting unit imbricate the cutting blades of the other cutting unit. In operation, rotation of the cutting units in opposite directions force the brushwood between the cylindrical surfaces where the blades cut the brushwood and throw the cut brushwood material upwardly. A funnel-like channel has a wide lower opening surrounding the cutting units to efficiently receive the cut brushwood material directed toward a discharge opening of this channel. The latter opening can be provided with a spout to discharge the cut brushwood material into a container.

18 Claims, 3 Drawing Sheets

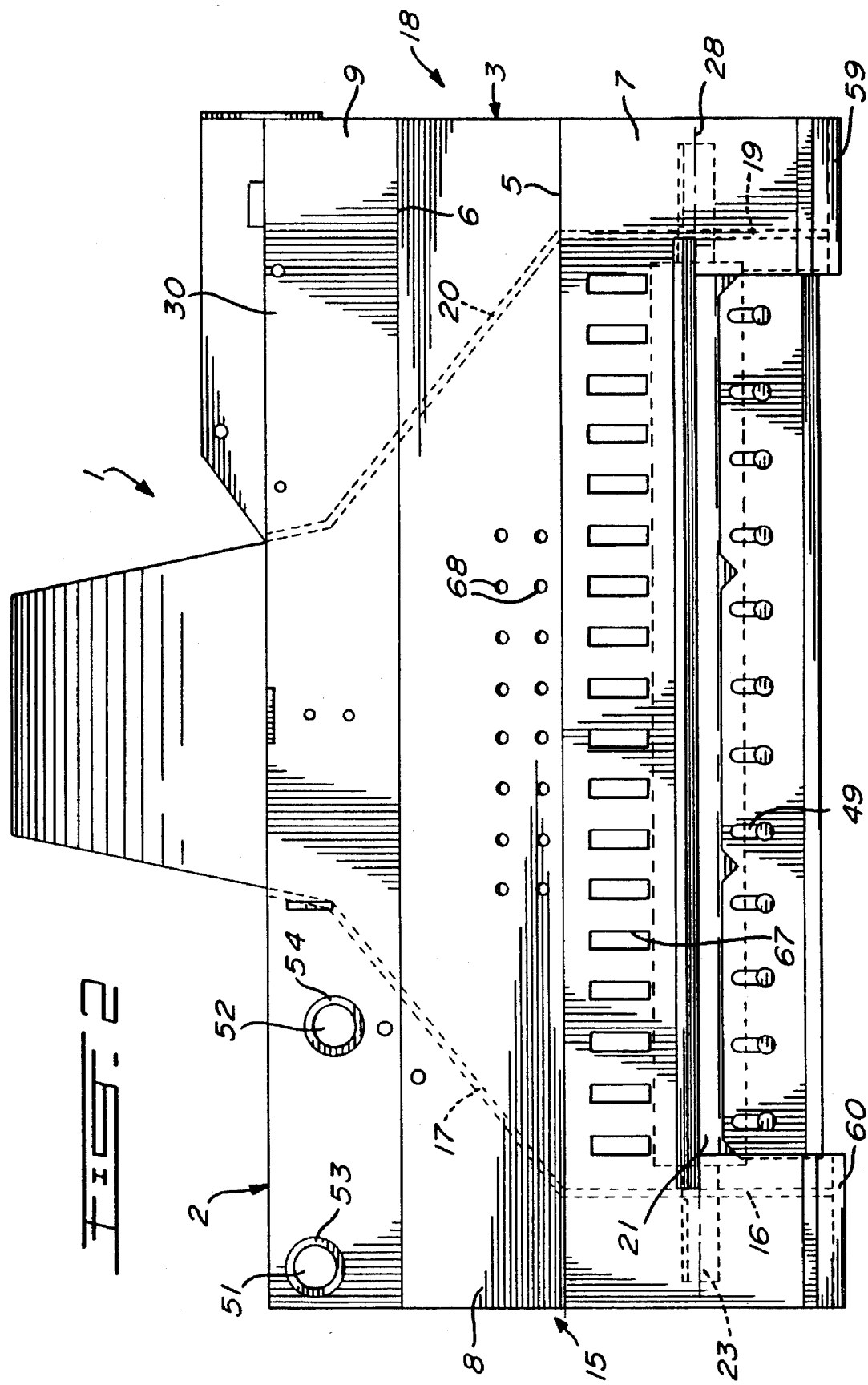

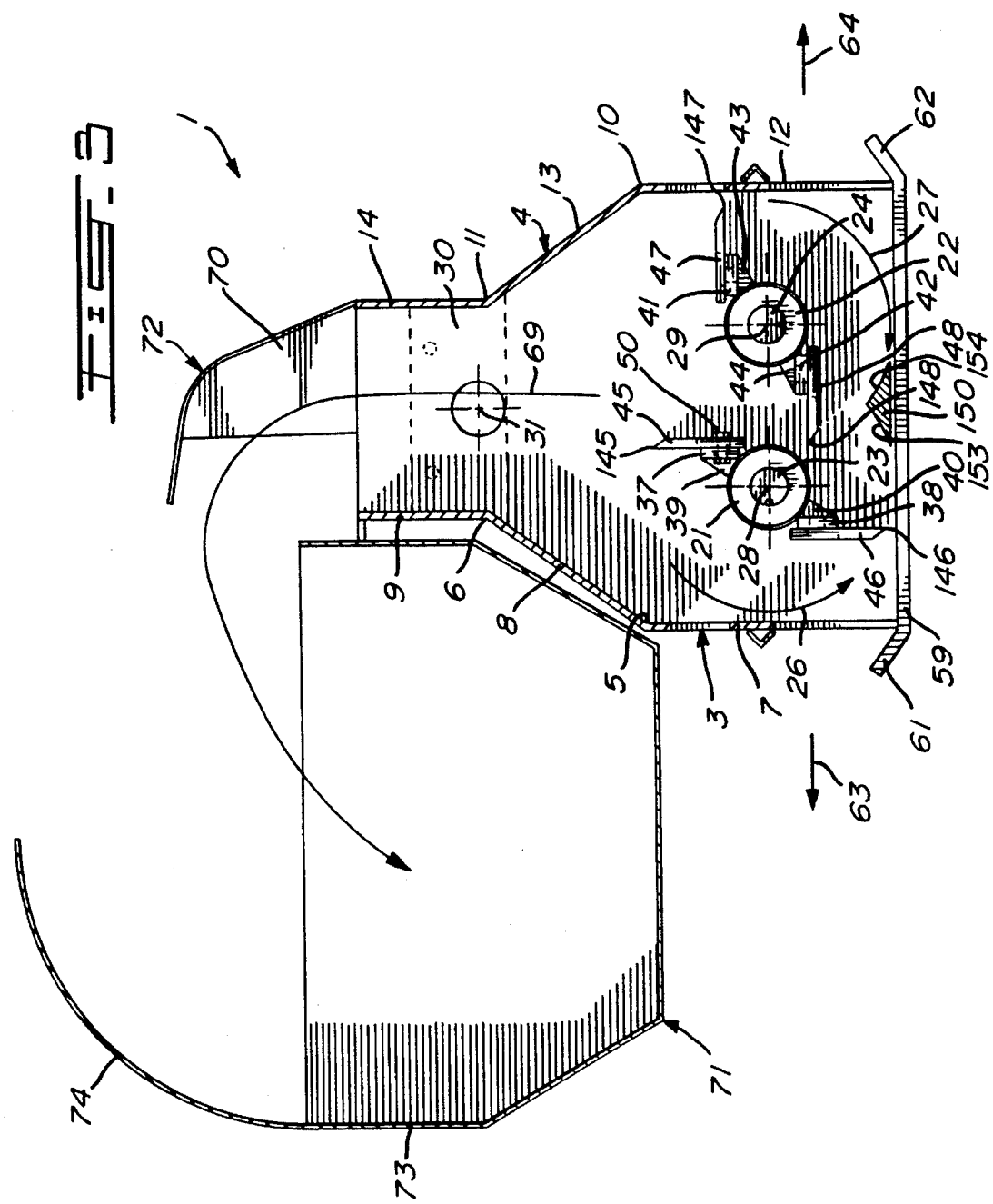

BRUSHWOOD CLEARING MACHINE CAPABLE OF CUTTING AND RECUPERATING THE CUT BRUSHWOOD MATERIAL

BACKGROUND OF THE INVENTION

1. Field of the Invention

The present invention relates to a brushwood clearing machine capable of simultaneously cutting the brushwood and throwing the cut brushwood material toward a discharge spout. Of course, the cut brushwood material from the discharge spout can be easily recuperated.

2. Brief Description of the Prior Art

U.S. Pat. No. 4,158,945 (Burke) issued on Jun. 26, 1979, is concerned with a brushwood clearing device comprising a pair of adjacent rotative blade assemblies. These two blade assemblies rotate in opposite directions about respective vertical axes. The brushwood is shred by the blade assemblies and the shred brushwood material is spread over the surface of the ground.

Obviously, the brushwood clearing device of U.S. Pat. No. 4,158,945 is not capable of recuperating the shred brushwood material. This device is, on the contrary, specifically designed to reduce the brushwood to a consistency that can be plowed into the ground or spread over the surface of the ground without the necessity of removal, burning of the like.

U.S. Pat. No. 3,996,980 (Pallari) granted on Dec. 14, 1976, relates to a clearing machine for brushwood comprising a pair of cutting units provided with rotary blades rotating in opposite directions about respective vertical axes. The cutting units fall the brushwood which is supplied to a chopper unit for reducing the fell brushwood to a chip form. A blower can be used in combination with a pipe to deposit the chips to a loading bed arranged immediately beside the clearing machine.

Although the machine of U.S. Pat. No. 3,996,980 is capable of recuperating the cut brushwood material, it requires (a) a pair of cutting units to fall the brushwood, (b) a chopper unit to reduce the fell brushwood to chip form, and (c) a blower and pipe to deposit the chips in a container. The parts (a), (b) and (c) are intricately combined and obviously increases the cost of the machine.

OBJECT OF THE INVENTION

An object of the present invention is therefore to provide a brushwood clearing machine capable of overcoming the above mentioned drawbacks of the prior art by felling the brushwood, cutting the brushwood and throwing the cut brushwood material toward a discharge spout, in a single operation.

SUMMARY OF THE INVENTION

In accordance with the present invention, there is provided a brushwood clearing machine comprising:

a pair of first and second mutually adjacent rotary brushwood cutting units;

means for rotating the first and second cutting units in opposite directions about first and second axes, respectively, rotation of these first and second cutting units in opposite directions forcing the brushwood between the cutting units where the brushwood is cut and cut brushwood material is thrown in a desired direction;

and channel means having proximate opening means to receive the thrown brushwood material directly from the cutting units and distal opening means to discharge the cut brushwood material.

Advantageously, the brushwood clearing machine comprises a container in which the cut brushwood material from the distal opening means is discharged.

In accordance with preferred embodiments of the present invention:

the first and second cutting units are elongate, the first and second axes of rotation of the first and second cutting units both lie in a generally horizontal plane, and the rotating means comprises means for rotating the first and second cutting units in respective opposite directions adequate to throw the cut brushwood material generally upwardly;

the first cutting unit comprises a first outer cylindrical surface centered on the first axis of rotation, and longitudinal brushwood cutting blades mounted on the first outer cylindrical surface, and the second cutting unit comprises a second outer cylindrical surface centered on the second axis of rotation, and longitudinal brushwood cutting blades mounted on the second outer cylindrical surface;

the longitudinal blades mounted on the first outer cylindrical surface comprise diametrically opposed blades lying in respective planes parallel to each other and parallel to but spaced apart from the first axis of rotation, and the longitudinal blades mounted on the second outer cylindrical surface comprise diametrically opposed blades lying in respective planes parallel to each other and parallel to but spaced apart from the second axis of rotation;

in the region between the first and second cutting units, the longitudinal cutting blades mounted on the first outer cylindrical surface imbricate the longitudinal cutting blades mounted on the second outer cylindrical surface;

the channel means comprises a funnel-like channel surrounding the first and second cutting units at the proximate opening means, and a discharge spout at the distal opening means to direct the cut brushwood material in the container.

To better control the size of the pieces of brushwood cut by the brushwood clearing machine, an elongate anvil, parallel to the first and second axes of rotation, is mounted at equal distance between the first and second cutting unit, under these units. The brushwood will rest on this anvil to help the blades to cut it.

The brushwood clearing machine can be attached to the free end of an articulated boom-and-arm assembly of a hydraulic shovel, to be displaced in the brushwood to be cleared.

The objects, advantages and other features of the present invention will become more apparent upon reading of the following non restrictive description of a preferred embodiment thereof, given by way of example only with reference to the accompanying drawings.

BRIEF DESCRIPTION OF THE DRAWINGS

In the appended drawings:

FIG. 2 is a side elevational view of the brushwood clearing machine of FIG. 1;

FIG. 3 is a front elevational view of the brushwood clearing machine of FIGS. 1 and 2.

DETAILED DESCRIPTION OF THE PREFERRED EMBODIMENT

In the appended drawings, the brushwood clearing machine is generally identified by the reference 1.

The brushwood clearing machine 1 comprises an elongate frame 2 (FIG. 2) made of thick steel plates welded together.

Figure 1:
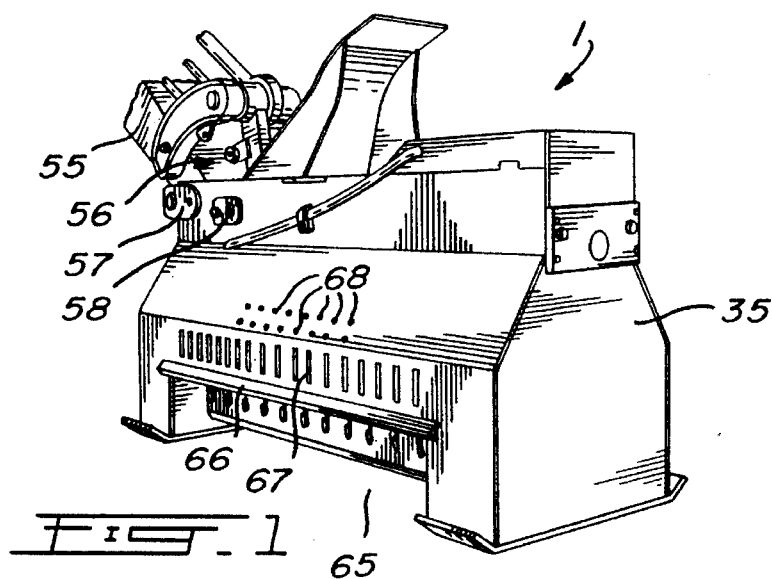
FIG. 1 is a perspective view of a brushwood clearing machine in accordance with the present invention, mounted on the free end of the articulated boom-and-arm assembly of a hydraulic shovel.

The elongate frame 2 includes a pair of longitudinal side plates 3 and 4 (FIGS. 1 and 2). The side plate 3 is bent horizontally at 5 and 6 to define a lower vertical flat plate portion 7, an intermediate flat plate portion 8 oblique with respect to the vertical, and an upper vertical flat plate portion 9. Similarly, the side plate 4 is bent horizontally at 10 and 11 to define a lower vertical flat plate portion 12, an intermediate flat plate portion 13 oblique with respect to the vertical, and an upper vertical flat plate portion 14. The lower vertical plate portions 7 and 12 are parallel, the upper vertical plate portions 9 and 14 are also parallel, the spacing between the plate portions 7 and 12 is larger than the spacing between the plate portions 9 and 14, and the intermediate plate portions 8 and 13 are upwardly convergent to thereby define a funnel-like channel.

To complete the funnel-like channel, the proximate end 15 (FIG. 2) of the elongate frame 2 comprises a lower transversal and vertical flat plate 16 interconnecting the lower plate portions 7 and 12. The transversal plate 16 is welded and perpendicular to the lower plate portions 7 and 12. The oblique intermediate plate portions 8 and 13 as well as the vertical upper plate portions 9 and 14 are interconnected, at the proximate end 15 of the frame 2, by a tapered transversal flat plate 17 welded to plate portions 8 and 13, to plate portions 9 and 14, and to the upper edge of the lower transversal plate 16. At the distal end 18 (FIG. 2) of the elongate frame 2, the lower plate portions 7 and 12 are interconnected through a lower transversal and vertical flat plate 19 welded and perpendicular to the plate portions 7 and 12. Plate portions 8 and 13 as well as plate portions 9 and 14 are interconnected, at the distal end 18 of the elongate frame 2, by a tapered transversal flat plate 20 welded to plate portions 8 and 13, to plate portions 9 and 14, and to the upper edge of the lower plate 19. As can be seen in FIG. 2, the plates 17 and 20 are oblique with respect to the vertical and are upwardly convergent.

Figure 4:
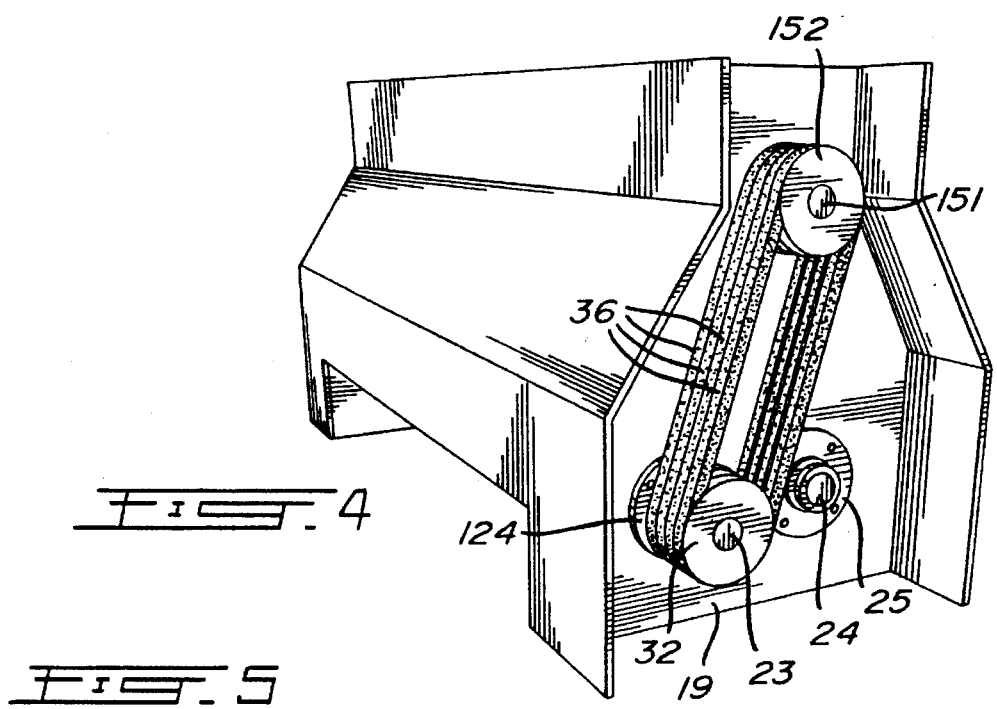
FIGS. 4 and 5, which are disposed on the same sheet of formal drawings as FIG. 1, illustrate elements used for driving the brushwood clearing machine of FIGS. 1–3.
Figure 5:
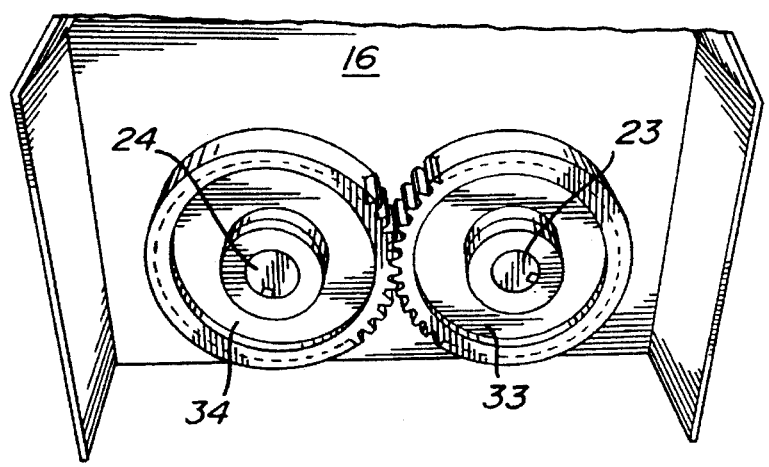

A pair of longitudinal cylinders 21 and 22 are mounted on respective rotative shafts 23 and 24, respectively (FIG. 3). A first end of the shaft 23 passes through the plate 19 and is rotatively mounted on that plate 19 through ball bearing 124 (FIG. 4). The second end of the shaft 23 passes through the plate 16 and is rotatively mounted on this plate 16 through ball bearing (not shown). In the same manner, a first end of the shaft 24 passes through the plate 19 and is rotatively mounted on that plate 19 through ball bearing 25 (FIG. 4). The second end of this shaft 24 passes through the plate 16 and is rotatively mounted on this plate 16 through ball bearing (not shown).

As shown in FIG. 3, the cylinders 21 and 22 are rotating in opposite directions 26 and 27, respectively, about respective parallel and spaced apart axes 28 and 29, lying into a common generally horizontal plane. To drive the cylinders 21 and 22, an hydraulic motor (not shown), located in upper hollow portion 30 (FIGS. 2 and 3) of the frame 2, has a output shaft 151 (FIG. 4) rotating about an horizontal axis 31 (FIG. 3) and bearing a four-groove pulley 152. The first end of the shaft 23 (FIG. 4) is also provided with a four-groove pulley 32 connected, through a set of four belts 36, to the pulley 152 of the output shaft 151 of the hydraulic motor to rotate the shaft 23 in direction 26 (FIG. 3). At the proximate end 15 of the frame 2, a pair of toothed wheels 33 and 34 are mounted on the corresponding ends of the shafts 23 and 24, respectively. The toothed wheels 33 and 34 are meshed with each other whereby rotation of the shaft 23 in direction 26 automatically causes rotation of shaft 24 in the opposite direction 27. The toothed wheels also maintain the relative angular position of the shaft 23 and 24 and of the cylinders 21 and 22.

Preferably, a plate such as 35 (FIG. 1) will cover the two ends 15 and 18 of the frame 2 to prevent dirt and cut brushwood material to reach the belts 36, the pulleys 32 and 152 and the toothed wheels 33 and 34.

A pair of longitudinal blade holding bars 37 and 38, parallel to the axis 28, are welded to the outer cylindrical surface of the cylinder 21 through triangular plates such as 39 and 40. As can be seen, the bars 37 and 38 are lying in respective planes parallel to each other and parallel to but spaced apart from the axis 28. Another pair of longitudinal blade holding bars 41 and 42, parallel to the axis 29, are welded to the outer cylindrical surface of the cylinder 22 through triangular plates such as 43 and 44. Again, the bars 41 and 42 are lying in respective planes parallel to each other and parallel to but spaced apart from the axis of rotation 29.

Blades 45, 46, 47 and 48 are respectively mounted on the holding bars 37, 38, 41 and 42, respectively. Each blade 45–48 is provided with longitudinally distributed and transversally extending slot openings such as 49 (FIG. 2) to enable positional adjustment of these blades, and therefore of their cutting edges 145–148, on the corresponding holding bar. Each blade 45–48 is mounted on the associated holding bar through bolt-and-nut assemblies such as 50 (FIG. 3), each bolt passing through one of the slot openings 49 and a corresponding hole in the holding bar. The cutting edge 145–148 of each blade 45–48 is positioned on the side of the associated rotative cylinder to efficiently hit and cut the brushwood upon rotation of this cylinder. As can be seen in the appended drawings, the cutting edges 145–148 are also parallel to the axes of rotation 28 and 29.

As shown in FIG. 3, the blades 45–48 of the cylinders 21 and 22 are imbricated; blade 48 will pass in the space between the cylinders 21 and 22 followed by the blades 46, 47 and 45 in sequence. This sequence is continuously repeated during rotation of the cylinders 21 and 22. For that purpose, the angular position of the blades 45 and 46 about the axis of rotation 28 is 90° apart from the angular position of the blades 47 and 48 about the axis of rotation 29.

One can also note from FIG. 3 that the shortest distance between the outer cylindrical surfaces of the cylinders 21 and 22 is slightly longer than the shortest distance between the cutting edges 145–148 of the blades 45–48 from the cylindrical outer surface of the cylinders 21 and 22 on which the blades are mounted. In operation, the brushwood will be squeezed between the edges 145–148 of the blades 45–48 and the cylindrical surface of the opposite cylinder 21 or 22 to improve the efficienly of the machine 1 in cutting the brushwood. The above described positional adjustment of the cutting blades 45–48 enables control of the distance between the cutting edges 145–148 and the cylindrical surface of the opposite cylinder 21 or 22 to obtain an optimal efficiency in cutting the brushwood.

To better control the size of the pieces of brushwood cut by the machine 1, an elongate, longitudinal anvil 150 (FIG. 3), parallel to the axes of rotation 28 and 29, is mounted at equal distance between the cylinders 21 and 22, under these cylinders. The anvil 150 comprises a first top surface 153, preferably semicircular in cross section, and so positioned that the blade edges 145 and 146 pass close to this surface 153 during rotation of the cylinder 21. In the same manner, the anvil 150 comprises a second top surface 154, advantageously semicircular in cross section, and so positioned that the blade edges 147 and 148 pass close to this surface 154 during rotation of the cylinder 21. Obviously, the brushwood will rest on the anvil 150 to help the blade edges 145–148 to cut the same.

At the proximate end 15 of the frame 2, two pairs 51 and 52 of aligned holes are cut in the plate portions 9 and 14 and sleeves such as 53 and 54 are welded on the outer face of the plate portions 9 and 14 around the latter holes. To attach the frame 2 of the brushwood clearing machine 1 on the free end 56 of the articulated boom-and-arm assembly 55 (FIG. 1) of a hydraulic shovel, the free end 56 of the boom-and-arm assembly 55 is first positioned between the plate portions 9 and 14 of the frame 2. Pins 57 and 58 are then mounted in the aligned pairs of holes 51 and 52, the sleeves such as 53 and 54, and corresponding sleeves (not shown) of the free end 56 of the boom-and-arm assembly 55. This method of attachment of the brushwood clearing machine 1 to the free end of the boom-and-arm assembly of a hydraulic shovel is well known to those skilled in the art and will therefore not be further described. The machine 1 can then be handled through operation of the articulated boom-and-arm assembly 55 of the hydraulic shovel.

Transversal runners 59 and 60 (FIGS. 2 and 3) are welded under the frame 2 at the distal and proximate ends 18 and 15 thereof, respectively. These runners 59 and 60 comprise upwardly bent ends such as 61 and 62 (for runner 59) to slide on the ground upon lateral movement of the frame 2 in either direction 63 or 64 (FIG. 3).

On the two sides of the elongate frame 2, a bottom rectangular part of the lower plate portions 7 and 12 are cut to define an opening such as 65 (FIG. 1) enabling the brushwood to reach the rotative blades 45–48 upon lateral movement of the frame 2 through the boom-and-arm assembly 55 of the hydraulic shovel. The upper edges delimiting the openings such as 65 can be reinforced by means of an angle iron such as 66 (FIG. 1) welded to the outer side of the plate portions 7 and 12.

Oblong openings such as 67 (FIGS. 1 and 2) are cut in the plate portions 7 and 12 above the bottom opening such as 65, and circular openings such as 68 are cut through the plate portions 8 and 13 to properly ventilate the inside of the frame 2. These openings 67 and 68 can improve the operation of the brushwood clearing machine 1 by preventing vacuum to be formed within the frame 2. Such vacuum can for example interfere in upwardly throwing the cut brushwood material as will be described hereinafter.

In operation, the boom-and-arm assembly 55 of the hydraulic shovel is operated to displace the frame 2 downwardly and/or laterally toward brushwood to be cleared. When the blades 45–48, rotating in the opposite directions 26 and 27, reach the brushwood, the brushwood is forced between the cylinders 21 and 22 where the blades 45–48 cut the brushwood in relatively small pieces. As the cylinders 21 and 22 rotate in the opposite directions 26 and 27, the blades 45–48 throw the cut brushwood pieces upwardly (see arrow 69 in FIG. 3) upon passage of these blades between the cylinders 21 and 22.

More specifically, the cut brushwood material (arrow 69) is thrown upwardly in the funnel-like channel of frame 2 where they converge toward a discharge spout 70 that can be oriented in many directions. The discharge spout 70 is mounted in a conventional manner on the top of the frame 2 in alignment with the top discharge opening of the above described funnel-like channel to receive the upwardly thrown brushwood material. As can be appreciated, the bottom opening means, of larger diameter, of the above described funnel-like channel surrounds the cylinders 21 and 22 and the blades 45–48 to efficiently receive the upwardly thrown cut brushwood material.

A container 71 (FIG. 3) can be bolted or otherwise attached on one side of the frame 2. The discharge spout 70 is then oriented so that its arcuate wall 72 directs the cut brushwood material toward the lateral container 71. The outer side wall 73 of the container is extended upwardly to form an arcuate upper side wall portion 74 bending toward the discharge spout 70 to force the cut brushwood material discharged from the spout 70 in the container 71.

When the container 71 is full, the boom-and-arm assembly 55 is articulated to tilt the container 71 and dump its contents for example in the body of a truck whereby the cut brushwood material can be easily recuperated.

Satisfactory operation of the brushwood clearing machine 1 in accordance with the present invention has been obtained with cylinders 21 and 22 and blades 45–48 rotating in directions 26 and 27 at an angular speed of about 2000 R.P.M.

Although the present invention has been described hereinabove by way of a preferred embodiment thereof, this embodiment can be modified at will, within the scope of the appended claims, without departing from the spirit and nature of the present invention.

The embodiments of the invention in which an exclusive property or privilege is claimed are defined as follows:

1. A brushwood clearing machine comprising:
   a pair of first and second elongate, mutually adjacent rotary brushwood cutting units;
   means for rotating said first and second cutting units about respective first and second axes both lying in a generally horizontal plane, said rotating means comprising means for rotating said first and second cutting units in respective opposite directions adequate to force the brushwood between said cutting units where said brushwood is cut and to throw the cut brushwood material generally upwardly; and
   channel means having proximate opening means to receive the thrown brushwood material directly from said cutting units and distal opening means to discharge said cut brushwood material.

2. A brushwood clearing machine as recited in claim 1, further comprising a container in which the cut brushwood material from said distal opening means is discharged.

3. A brushwood clearing machine as recited in claim 1, wherein:
   said first cutting unit comprises a first outer tubular surface centered on said first axis of rotation, and brushwood cutting blades mounted on said first outer tubular surface; and
   said second cutting unit comprises a second outer tubular surface centered on said second axis of rotation, and brushwood cutting blades mounted on said second outer tubular surface.

4. A brushwood clearing machine as recited in claim 3, in which said first and second outer tubular surface are cylindrical.

5. A brushwood clearing machine as recited in claim 3 or 4, in which said brushwood cutting blades mounted on said first outer tubular surface comprise longitudinal blades having cutting edges substantially parallel to said first axis of rotation, and in which said brushwood cutting blades mounted on said second outer tubular surface comprise longitudinal blades having cutting edges substantially parallel to said second axis of rotation.

6. A brushwood clearing machine as recited in claim 5, wherein each blade mounted on the first outer tubular surface is lying in a plane parallel to but spaced apart from said first axis of rotation, and wherein each blade mounted on the second outer tubular surface is lying in a plane parallel to but spaced apart from said second axis of rotation.

7. A brushwood clearing machine as recited in claim 5, wherein said longitudinal blades mounted on the first outer tubular surface comprise diametrically opposed blades lying in respective planes parallel to each other and parallel to but spaced apart from said first axis of rotation, and wherein said longitudinal blades mounted on the second outer tubular surface comprise diametrically opposed blades lying in respective planes parallel to each other and parallel to but spaced apart from said second axis of rotation.

8. A brushwood clearing machine as recited in claim 3, wherein each brushwood cutting blade comprises a cutting edge, wherein said first cutting unit comprises means for adjusting the distance between the cutting edges of the blades mounted on said first outer tubular surface and the first axis of rotation, and wherein said second cutting unit comprises means for adjusting the distance between the cutting edges of the blades mounted on said second outer tubular surface and the second axis of rotation.

9. A brushwood clearing machine as recited in claim 5, wherein said first cutting unit comprises means for adjusting the distance between the cutting edges of the longitudinal blades mounted on said first outer tubular surface and said first axis of rotation, and wherein said second cutting unit comprises means for adjusting the distance between the cutting edges of the longitudinal blades mounted on said second outer tubular surface and said second axis of rotation.

10. A brushwood clearing machine as recited in claim 3, wherein said brushwood cutting blades are longitudinal cutting blades and wherein, in the region between said first and second cutting units, the longitudinal cutting blades mounted on said first outer tubular surface imbricate the longitudinal cutting blades mounted on the second outer tubular surface.

11. A brushwood clearing machine as recited in claim 10, wherein said longitudinal cutting blades mounted on said first outer tubular surface comprise a first pair of diametrically opposed blades, wherein said longitudinal cutting blades mounted on said second outer tubular surface comprises a second pair of diametrically opposed blades, and wherein said first and second pairs of diametrically opposed blades have respective angular positions about said first and second axes of rotation, respectively, 90° apart from each other.

12. A brushwood clearing machine as recited in claim 5, wherein the shortest distance between the cutting edge of one longitudinal blade mounted on the first outer tubular surface and said first outer tubular surface is slightly smaller than the shortest distance between said first and second outer tubular surfaces, and wherein the shortest distance between the cutting edge of one longitudinal blade mounted on the second outer tubular surface and said second outer tubular surface is slightly smaller than the shortest distance between said first and second outer tubular surfaces.

13. A brushwood clearing machine as recited in claim 1 or 2, wherein said channel means comprises a funnel-like channel surrounding said first and second cutting units at said proximate opening means.

14. A brushwood clearing machine as recited in claim 2, wherein said channel means comprises a discharge spout at said distal opening means to direct said cut brushwood material in said container.

15. A brushwood clearing machine as recited in claim 1 or 2, comprising means for attaching said brushwood clearing machine to the free end of an articulated boom-and-arm assembly, to displace through said boom-and-arm assembly the clearing machine in the brushwood to be cleared.

16. A brushwood clearing machine as recited in claim 15, comprising runners extending transversally beneath said machine to slide on the ground.

17. A brushwood clearing machine as recited in claim 1, further comprising means on which the brushwood rests to facilitate cutting of said brushwood by the first and second cutting units.

18. A brushwood clearing machine as recited in claim 3, further comprising an elongate member mounted lengthwise between said first and second elongate cutting units under said generally horizontal plane, said brushwood resting on said elongate member to facilitate cutting of said brushwood by said blades.

* * * * *